May 9, 1950   R. O. WARNER   2,507,071
THERMOSTATIC CONTROL MECHANISM
Filed Feb. 23, 1946   2 Sheets-Sheet 1

INVENTOR.
Roland O. Warner.
BY
E. J. Balluff
ATTORNEY.

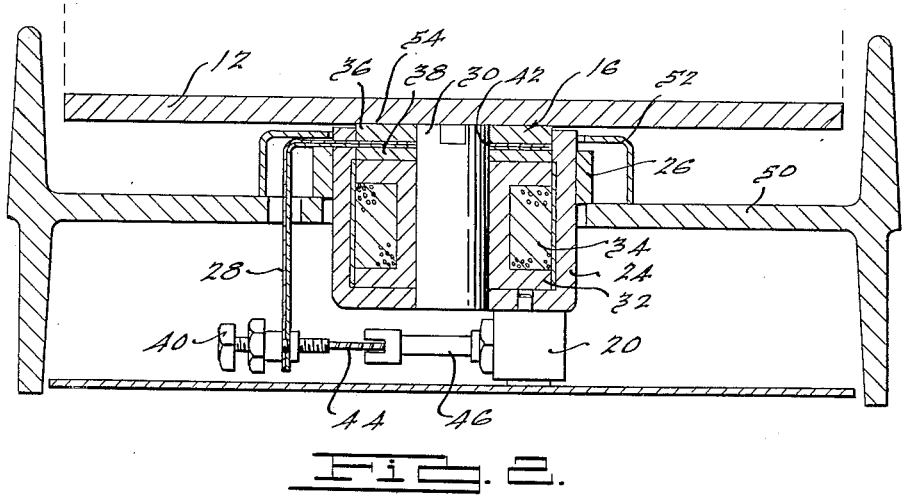
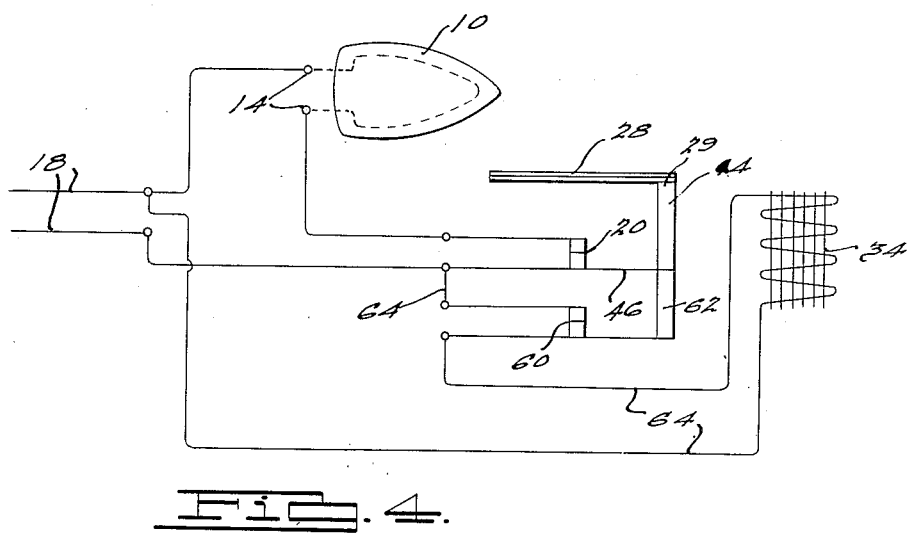

Patented May 9, 1950

2,507,071

UNITED STATES PATENT OFFICE 2,507,071

THERMOSTATIC CONTROL MECHANISM

Roland O. Warner, Bloomington, Ill., assignor to Eureka Williams Corporation, Detroit, Mich., a corporation of Michigan Application February 23, 1946, Serial No. 649,610

1 Claim. (Cl. 219—25)

This invention relates to thermostatic control mechanisms and has particular reference to mechanisms for use in connection with irons of the cordless type embodying certain improvements over the construction disclosed and claimed in the patents to Beach, No. 2,151,888, issued March 25, 1939, No. 2,181,042, issued November 21, 1939, and the patent to Chereton, No. 2,284,132, issued May 26, 1942.

Ironing devices of this type comprise a base or stand to which a current conducting cord is connected, an iron having an electric resistance heating element therein and adapted to be arranged on the stand, the stand and iron having contacts which are engaged when the iron is on the stand so as to close the circuit through the heating element, a switch for controlling such circuit and a thermostat on the base and arranged to engage the sole plate of the iron when the same is on the stand, such thermostat being operative to open and close such switch so as to control the supply of current to the heating element in the iron when the iron is on the stand and in accordance with the temperature of the sole plate of the iron.

In the constructions disclosed in the aforesaid patents, the contacts and the thermostat form the support for the iron on the stand. In irons made according to the construction shown in the Chereton patent, difficulty has been experienced in obtaining a good thermal conducting path between the thermostat and the sole plate of the iron, due principally to the fact that the plane in which the sole plate was supported did not correspond with the plane of the supporting surface afforded by the thermostatic element. This has prevented the thermostat from responding efficiently to the temperature changes in the sole plate and hence has interfered with the accurate control of the temperature of the iron.

According to the present invention, this difficulty has been obviated by loosely supporting the thermostatic element so that its sole plate engaging surface may be adjusted to that of the surface of the sole plate and by providing a magnet for holding the thermostat against the sole plate so as to obtain surface contact therebetween, as distinguished from line or point contact which is obtained in the construction shown in the Chereton patent.

The principal object of the invention, therefore, is to provide an iron of the aforesaid type in which means are provided to insure good surface contact between the thermostat and the sole plate of the iron.

Other and further objects of the invention will be apparent from the following description and claim and will be understood by reference to the accompanying drawings, of which there are two sheets, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claim. I also contemplate that of the several different features of my invention, certain ones thereof may be advantageously employed in some applications separate and apart from the remainder of the features.

In the drawings:

Fig. 2 is an enlarged fragmentary sectional view taken generally along the line 2—2 of Fig. 3;

Fig. 4 is a diagrammatic view of an electric circuit which may be employed in practicing the invention.

Figure 1:
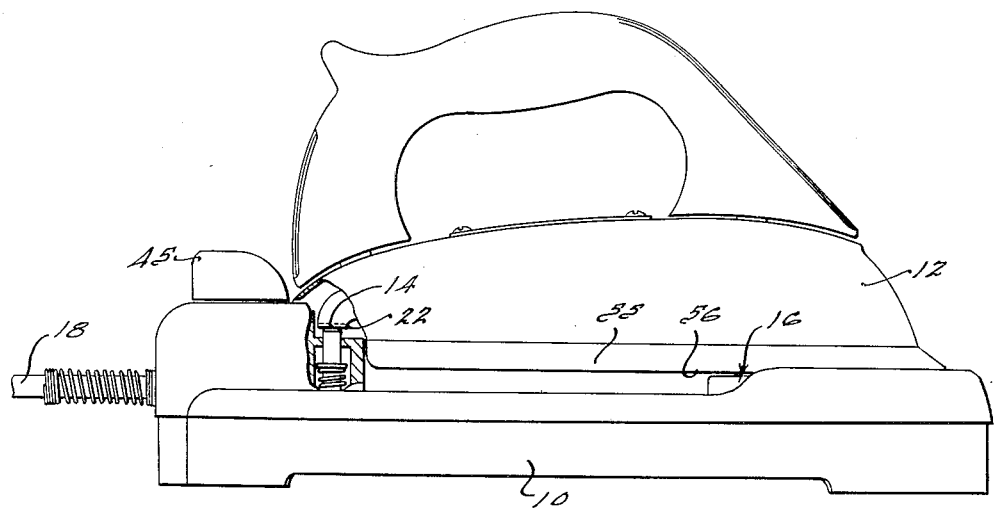
Fig. 1 is an elevational view of an ironing apparatus embodying the invention.
Figure 3:
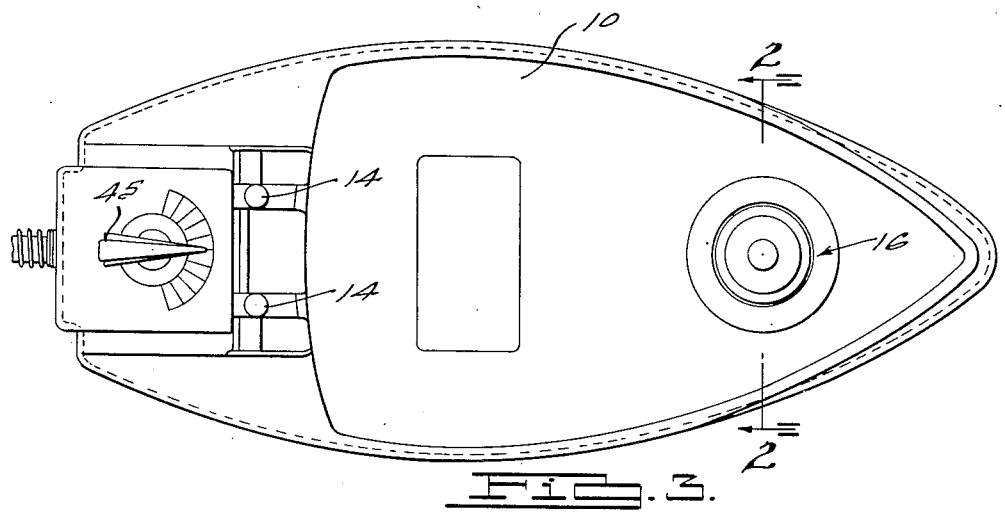
Fig. 3 is a plan view of the base or stand.

As shown in the drawings, an ironing apparatus embodying the invention comprises a stand 10 and a hand iron 12. The stand or base 10 is provided with two electric contacts 14 and a thermostatic support 16 which form a three-point support for the iron on the stand. A current conducting cord 18 is connected to the stand 10 and is electrically connected to the contacts 14 under the control of a switch 20 (Fig. 2).

The iron 12 has two contacts 22, one of which is shown in Fig. 1, which are arranged to engage the contacts 14 when the iron is on the stand so as to support the iron and in addition to put the electric resistance heating element in the iron 12 in an electrical circuit under the control of the switch 20. For further particulars of the construction and operation of irons of this type, reference may be had to the foregoing patents and particularly to the patent of Chereton.

The thermostat support and assembly 16 comprises a cup-shaped casing 24, an encircling band 26 fixed thereto, a thermally responsive or bimetallic element 28, a laminated core 30, a spool or bobbin 32, a coil 34, a pair of hard brass washers 36 and 38, and an adjustable screw 40.

The casing 24 forms the housing of the electromagnet and has the coil 34, the spool 32 and the core 30 operatively secured therein. The hard brass washers 36 and 38 are secured to the upper end of the core 30 and within the open top of the casing 24 to close the same. The bimetallic element 28 includes a horizontally extending portion 42 which is clamped between the washers 36 and 38 and extends through a slot in the casing 24 just above the band 26. The horizontal portion of the bimetallic element 28 is securely fixed by the washers 36 and 38 and the casing 24. The vertically extending portion of the bimetallic element 28 is adapted to be deflected to the right (Fig. 2). The screw 40 carried by the movable end of the bimetallic member 28 is arranged to react through a slidable cam member 44 on a switch actuating plunger 46 for opening the contacts of the switch 20. This feature is fully disclosed in the aforesaid Chereton patent. The switch 20 may be of any conventional or desired construction and include contacts which are normally closed. The switch contacts are arranged to be opened by movement of the switch actuating plunger 46 to the right (Fig. 2).

The casing 24 is loosely arranged in a hole in the wall 50 of the base 10. The band 26 is arranged to rest on the rim of the wall 50 defining the opening through which the casing 24 depends so as to support the casing 24 on the base. A guard 52 surrounds that portion of the thermostatic assembly 16 which projects above the wall 50. However, the upper flat surface 54 of the washer 36 is arranged above the top of the guard 52 and forms a supporting surface for the sole plate 56 of the iron.

Reference may now be had to Fig. 4 wherein the circuit of the stand and the switch actuating mechanism is diagrammatically illustrated. As shown in this view, the movable end 29 of the bimetallic element 28 is arranged to react through the member 44 and the switch actuating plunger 46 to open the contacts of the switch 20 when the iron becomes heated to the condition for which the thermostatically controlled switch is set by the adjustable knob 45. Another switch 60 is provided for controlling the circuit through the coil 34 of the electromagnet. A member 62 movable with the member 46 is arranged to open the contacts of the switch 60 simultaneously with the opening of the contacts of the switch 20. When the thermostat cools down, the contacts of both switches would close simultaneously.

The current conductors 64 for the coil 34 are connected to the current conductors 18 in parallel with the contacts 14 so that the coil 34 will be energized whenever the circuit through the heating element of the iron is closed. The energizing of the coil 34 will draw the thermostat assembly 16 up against the surface 56 of the sole plate 55 of the iron and so that the surface 54 will seat against the surface 56 of the sole plate so as to establish a good thermal path between the sole plate 55 and the bimetallic element 28.

The bobbin or spool 32 preferably is formed of steatite, while the sole plate 55 of the iron will have to be formed of iron or other material having magnetic properties.

When the bimetallic element 28 opens the switches 20 and 60, the thermostat assembly 16 will gravitationally return to its position where the band 26 will rest upon the rim around the opening in the wall 50 through which the casing 24 projects. In other words, when the electromagnet is energized, there will be surface contact between the surface 54 of the washer 36 and the surface of the sole plate 55. At this time, at least a part of the band 26 will engage the wall 50 of the base in order to support the assembly 16 and the front portion of the iron. However, when the switches 20 and 60 open, the contact between the surfaces 54 and 56 may change from a surface contact to a line contact.

The amount of shifting of the thermostat assembly 16 which takes place will depend upon how much misalignment there is between the plane of the surface of the sole plate of the iron and the plane of the surface 54 of the thermostat assembly 16 when the assembly 16 is supported upon the wall 50 by the band 26. The loose mounting of the thermostat assembly 16 and the electromagnetic means for shifting the same so as to bring the surface 54 into good surface engagement with the surface of the sole plate will act to compensate for such misalignment so that a good thermal path may be provided between the sole plate of the iron and the bimetallic element 28 when the coil 34 is energized.

In addition to the particular circuit illustrated for controlling the coil of the electromagnet, other circuits might be employed. The guard 52 will engage the band 26 and function to separate the assembly 16 from the iron when and if the iron is taken from the stand when the coil 34 is energized. The electromagnet may be of the shaded pole type and have a very low amperage, say, of the order of one-tenth of an ampere so that it will be possible readily to lift the iron from the stand without having to pull the stand away from the iron.

I also contemplate that the guard 52 may be formed so as to project slightly above the surface 54 so that the guard 52 would form the support for the iron and the thermostat would be electromagnetically brought into engagement with the sole plate surface when the circuit through the heating element of the iron was closed, or when the iron is on the stand.

While I have illustrated and described a preferred embodiment of my invention, it is understood that this is capable of modification and I therefore do not wish to be limited to the precise details set forth but desire to avail myself of such changes and alterations which fall within the purview of the following claim.

I claim:

Thermostatic control mechanism for an electrically heated device, whose temperature is to be controlled, comprising a base, a control unit loosely mounted on said base and having a planular surface forming a support for engagement with a plane surface of said device for supporting said device, a thermally responsive element secured to said control unit adjacent to and in intimate heat conducting relation with said planular surface, a switch controlling member mounted for movement in response to deflection of said thermally responsive element for operating a switch which controls the circuit of the means for heating said device, and means for positioning said control unit so that said planular surface thereof is parallel to and in engagement with said plane surface of said device when said device is supported by said support, said means comprising an electromagnet secured to and movable with said thermally responsive element.

ROLAND O. WARNER.

REFERENCES CITED

The following references are of record in the file of this patent:

UNITED STATES PATENTS

| Number | Name | Date |
|---|---|---|
| 1,135,389 | Moore | Apr. 13, 1915 |
| 2,284,132 | Chereton | May 26, 1942 |
| 2,288,510 | Brannon | June 30, 1942 |